United States Patent [19]

Dan et al.

[11] Patent Number: 5,190,984
[45] Date of Patent: Mar. 2, 1993

[54] PHOTODEGRADABLE EXPANDED POLYMERIC FOAM

[75] Inventors: Ervin R. Dan, Lexington; John Kwok, Holden, both of Mass.

[73] Assignee: Novacor Chemicals (International) S.A., Fribourg, Switzerland

[21] Appl. No.: 763,604

[22] Filed: Sep. 23, 1991

[51] Int. Cl.⁵ .............................. C08J 9/18
[52] U.S. Cl. .................... 521/59; 526/201; 526/346; 526/347; 526/347.1; 521/56; 521/60; 521/134; 521/139; 521/916
[58] Field of Search ............ 521/56, 59, 60, 134, 521/139, 916

[56] References Cited

U.S. PATENT DOCUMENTS 3,860,538  1/1976  Guillet et al. .................. 260/2.5

FOREIGN PATENT DOCUMENTS 1000000  11/1976  Canada .

*Primary Examiner*—Morton Foelak
*Attorney, Agent, or Firm*—Stevens, Davis, Miller & Mosher

[57] ABSTRACT

Foamable photodegradable suspension polymers of vinyl aromatic monomers may be prepared by dissolving a copolymer of a vinyl aromatic monomer and a vinyl ketone in the vinyl aromatic monomer and suspension polymerizing the resulting mixture. The resulting polymer may be foamed and used in the manufacture of food containers.

18 Claims, No Drawings

PHOTODEGRADABLE EXPANDED POLYMERIC FOAM

FIELD OF THE INVENTION

The present invention related to photodegradable beads prepared by suspension polymerization.

BACKGROUND OF THE INVENTION

Canadian Patent 1,000,000 issued Nov. 16, 1976 to James Guillet and Harvey Troth, corresponding to U.S. Pat. No. 3,860,538, discloses photodegradable polymers of vinyl aromatic monomers. Generally, the polymers are photodegradable polymers of styrene. The polymers are prepared by first preparing a copolymer of a vinyl aromatic monomer and a vinyl ketone. The copolymer is then blended, or let down with styrene polymer. The resulting polymer blend is photodegradable.

There is a growing concern over the degradability of plastics. While the polymers of the above noted patents do provide photodegradable plastics they do not provide a foamable bead which is suitable for the manufacture of closed-cell foamed products. In particular there is concern with disposable containers such as hot drink (coffee) cups and other containers for fast foods. Indeed, there is such concern that some jurisdictions, such as Florida, are contemplating bans on nondegradable plastic articles.

Generally, there are two method for making foamed polymers of vinyl aromatic monomers. Open celled foams may be prepared by an extrusion process. That is the polymer resin and a blowing agent are extruded and the blowing agent decomposes to yield a foamed polymer melt. Closed cell foamed articles are made by soaking small polymeric beads having a suitable particle size distribution in a suitable blowing agent such as pentane or hexane or halogenated hydrocarbons. The beads may be expanded together with a more environmentally friendly blowing agent such as nitrogen or carbon dioxide. Typically the polymer is made by a suspension process to provide the high surface ratio required to effectively permit the blowing agent to be taken up by the polymer. The impregnated beads are then partially expanded at low temperatures such as in steam. The partially expanded beads are then placed in a mold and further heated, again at relatively low temperatures to expand the beads and fuse the beads together to give a closed cell product. For containers closed cell construction is required as in open celled foams the contents leak through the foam. Unfortunately, the Guillet polymers are produced using conventional bulk polymerization technology which results in resin pellets which are of an inappropriate size for impregnation with blowing agent. Furthermore the technique of master batching Guillet polymers does not provide as homogenous a particle containing photodegradable polymer as those of the present invention.

While the Guillet patents have been available for some 20 years, there has, to the best of applicant's knowledge, been no attempt to manufacture suspension beads suitable for foaming using any of the Guillet technology. The present invention produces polymer particles having an appropriate particle size distribution in a high yield.

The present invention seeks to provide a foamable suspension polymer bead which is photodegradable. The present invention seek to provide a process for the manufacture of such beads and the present invention seeks to provide foamed containers made from such beads.

SUMMARY OF THE INVENTION

Accordingly, one aspect of the present invention provides a foamable photodegradable suspension polymerized bead comprising:

(i) from 1 to 20 weight % of a photodegradable polymer comprising:
 (a) from 0 to 99 weight % of one or more $C_{8-12}$ vinyl aromatic monomers which are unsubstituted or substituted by a $C_{1-4}$ alkyl radical; and
 (b) from 1 to 100 weight % of one or more monomers of the formula:

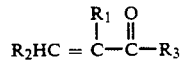
$$R_2HC = \overset{R_1}{\underset{|}{C}} - \overset{O}{\underset{\|}{C}} - R_3 \qquad I$$

wherein $R_1$, and $R_2$, are independently selected from the group consisting of a hydrogen atom and $C_{1-4}$ alkyl radical; and $R_3$ is selected from the group consisting of a $C_{1-4}$ alkyl radical and a $C_{6-10}$ aromatic radical; and (ii) from 80 to 99 weight % of one or more polymers comprising:
 (a) from 50 to 100 weight % of one or more $C_{8-12}$ vinylaromatic monomers which are unsubstituted or substituted by a $C_{1-4}$ alkyl radical; and
 (b) from 0 to 50 weight % of one or more monomers selected from the group consisting of:
  $C_{1-4}$ alkyl acrylates, $C_{1-4}$ alkyl methacrylates, anhydrides of $C_{4-6}$ dicarborylic acids and $C_{3-8}$ alkyl nitriles.

A further aspect of the present invention provides in a suspension polymerization process for the production of a base polymers comprising:

(i) from 50 to 100 weight % of one or more $C_{8-12}$ vinylaromatic monomers which are unsubstituted or substituted by a $C_{1-4}$ alkyl radical; and (ii) from 0 to 50 weight % of one or more monomers selected from the group consisting of:
 $C_{1-4}$ alkyl acrylates, $C_{1-4}$ alkyl methacrylates, anhydrides of $C_{4-6}$ dicarborylic acids and $C_{3-8}$ alkyl nitriles;

the improvement characterized in that there is dissolved in said vinyl aromatic monomer at least 1 weight % of a photodegradable polymer comprising:

(i) from 0 to 99 weight % of one or more $C_{8-12}$ vinyl aromatic monomers which are unsubstituted or substituted by a $C_{1-4}$ alkyl radical; and (ii) from 1 to 100 weight % of one or more monomers of the formula:

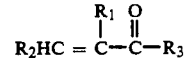
$$R_2HC = \overset{R_1}{\underset{|}{C}} - \overset{O}{\underset{\|}{C}} - R_3 \qquad I$$

wherein $R_1$, and $R_2$, are independently selected from the group consisting of a hydrogen atom and $C_{1-4}$ alkyl radical; and $R_3$ is selected from the group consisting of a $C_{1-4}$ alkyl radical and a $C_{6-10}$ aromatic radical.

A third aspect of the present invention provides a container made of foamed photodegradable suspension polymerized beads comprising:

(i) at least 1.0 weight % of a photodegradable polymer comprising:

(a) from 0 to 99 weight % of one or more $C_{8-12}$ vinyl aromatic monomers which are unsubstituted or substituted by a $C_{1-4}$ alkyl radical; and
(b) from 1 to 100 weight % of one or more monomers of the formula:

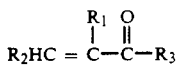

wherein $R_1$, and $R_2$, are independently selected from the group consisting of a hydrogen atom and $C_{1-4}$ alkyl radical; and $R_3$ is selected from the group consisting of a $C_{1-4}$ alkyl radical and a $C_{6-10}$ aromatic radical; and
(ii) the balance one or more polymers comprising:
(a) from 50 to 100 weight % of one or more $C_{8-12}$ vinylaromatic monomers which are unsubstituted or substituted by a $C_{1-4}$ alkyl radical; and
(b) from 0 to 50 weight % of one or more monomers selected from the group consisting of:
$C_{1-4}$ alkyl acrylates, $C_{1-4}$ alkyl methacrylates, anhydrides of $C_{4-6}$ dicarborylic acids and $C_{3-8}$ alkyl nitriles.

DETAILED DESCRIPTION

The foamable suspension bead polymers of the present invention may comprise a major amount, from 80 to 99, most preferably from 99 to 90, most preferably from 95 to 90 weight % of one or more polymers comprising:

(i) from 50 to 100 weight % of one or more $C_{8-12}$ vinylaromatic monomers which are unsubstituted or substituted by a $C_{1-4}$ alkyl radical; and
(ii) from 0 to 50 weight % of one or more monomers selected from the group consisting of:
$C_{1-4}$ alkyl acrylates, $C_{1-4}$ alkyl methacrylates, anhydrides of $C_{4-6}$ dicarborylic acids and $C_{3-8}$ alkyl nitriles.

Preferably, the $C_{8-12}$ vinyl aromatic monomer is selected form the group consisting of styrene, α-methyl styrene, t-butyl styrene, and p-methyl styrene.

Preferably, the acrylate and methacrylate monomers are selected from the group consisting of methyacrylate, ethylacrylate, butylacrylate, methyl methacrylate, ethyl methacrylate and butyl methacrylate. A suitable anhydride of a dicarboxylic acid is maleic anhydride. Suitable nitriles include acrylonitrile and methacrylonitrile.

If the base polymer is a copolymer of a vinyl aromatic monomer and one or more acrylate monomers, the weight ratio of vinyl aromatic monomer to acrylic monomers may range from 50:50 to 1:99, preferably 60:40 to 95:5. If the base polymer is a copolymer of a vinyl aromatic monomer and a nitrile monomer, the weight ratio of vinyl aromatic to nitrile will preferably be in the range from 95:5 to 70:30. If the base polymer is a copolymer of a vinyl aromatic monomer and an anhydride, the weight ratio of vinyl aromatic monomer to anhydride will preferably be in the range from 99:1 to 85:15. The weight ratio for terpolymers is known to those skilled in the art and will generally follow along the above teaching.

Correspondingly the foamable suspension bead polymers of the present invention may comprise from 1 to 20, preferably from 1 to 10, most preferably from 5 to 10 weight of a copolymer comprising:

(i) from 0 to 99 weight % of one or more $C_{8-12}$ vinyl aromatic monomers which are unsubstituted or substituted by a $C_{1-4}$ alkyl radical; and
(ii) from 1 to 100 weight % of one or more monomers of the formula:

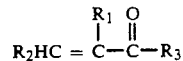

wherein $R_1$, and $R_2$, are independently selected from the group consisting of a hydrogen atom and $C_{1-4}$ alkyl radical; and $R_3$ is selected from the group consisting of a $C_{1-4}$ alkyl radical and a $C_{6-10}$ aromatic radical.

In the photodegradable polymer preferably the vinyl aromatic monomer is selected from the group consisting of styrene, α-methyl styrene, t-butyl styrene and p-methyl styrene.

In the photodegradable polymer the comonomer is a vinyl ketone. The ketone should have the formula I as above. In formula I preferably:

$R_2$, is a hydrogen atom and $R_1$, and $R_3$, are methyl radicals in which case the monomer is methyl isopropenyl ketone (MIPK); or $R_1$, and $R_2$ are hydrogen atoms and $R_3$ is a methyl radical in which case the monomer is methyl vinyl ketone (MVK).

The photodegradable polymer per se may be prepared using conventional bulk polymerization, preferably catalyzed with a hydrocarbon soluble free radical initiator such as benzoyl peroxide. Such process is disclosed in the above patents in the name of Guillet and Troth the text of which are hereby incorporated by reference.

The foamable suspension polymerized beads of the present invention may be prepared by merely dissolving the photodegradable polymer of the vinyl ketone and vinyl aromatic monomer described above in vinyl aromatic monomer as described above and suspension polymerizing the resulting mixture.

Typically the photodegradable polymer will be dissolved in vinyl aromatic monomer in the weight ratio indicated above. The resulting solution of polymer in vinyl aromatic (e.g. styrene) monomer is then formed into an emulsion. Generally a small amount, typically from about 0.5 to about 3 weight % of a surfactant which may be a fatty acid based soap such as sodium or potassium salts of stearic acid or a surface agent such as vinyl alcohol is dissolved in (deionized) water. To the water is added the solution of copolymer in vinyl aromatic monomer to give from about 30 to 50% of monomer.

It may be desirable in some instances to partially polymerize the vinyl aromatic monomer say up to about 20, preferably less than 15% conversion. Generally a catalyst or initiator will be added to the vinyl aromatic monomers. Suitable initiators include oil soluble initiators such a benzoyl peroxide. The initiator may be dissolved in the photodegradable polymer/monomer solution in an amount to provide from about 1 to 3 weight % based on the total weight of the system. In some cases it may be desirable to add an electrolyte to the polymerization system. Typically the electrolyte may be a salt of an alkali metal. The selection of electrolyte should be made bearing in mind the nature of the surfactant. Some electrolytes tend to greatly reduce the effectiveness of the surfactant (e.g. calcium salts). Generally, the electrolyte will be added to the aqueous phase. The hydrocarbon phase may then be mixed, usually under moderate agitation to form a suspension. The resulting suspension will then be heated, depending on the initiator system (e.g. hot polymerizations are heated to 60° to 85° C. and cold (redox systems) may be heated from 5° to 20° C.) to initiate polymerization. The polymerization is generally exothermic and industrially the reaction has to be cooled using a cooling jacket on the reactor (typically a continuous stirred tank reactor (CSTR)). The reactor may comprise one or more CSTRs in a chain or it may be more exotic such as a loop reactor. The polymerization is carried out usually for from 2 to 8 hours, depending on the size of the reactor to achieve a conversion in the high 90s (e.g. above 95, preferably above 99%) to yield a suspension having a solids content of about 30 to 50%. The resulting polymer may then be recovered using standard techniques such as filtering, or spray drying etc. The resulting particles have a particle size suitable for impregnation with a lower alkane blowing agent and foaming.

The recovered beads may then be impregnated with a blowing agent. Typically the beads are "soaked" in a blowing agent for a period of time from about 4 to 24 hours. Useful blowing agents include $C_{4-7}$ alkanes, such as pentane and hexane and chlorofluorocarbons such as $C_{2-4}$ alkanes which are substituted with at least one chlorine atom and at least one fluorine atom. The impregnated beads are then usually partly expanded by subjecting them to low temperatures such as steam or hot air. By controlling the density of the pre or partially foamed beads it is possible to control the final density of the foam in the product. The partially expanded beads are usually aged for from 4 to 24 hours. The partially expanded beads are then placed in a mould and again heated to further expand the foam and to cause the beads to fuse together. The mold is cooled to stabilize the foam and the closed cell foam product is removed from the mold.

The above processes may be used to manufacture containers such as hot or cold drink cups other food containers.

The present invention will now be illustrated by the following non-limiting examples in which unless otherwise indicated parts are parts by weight and % is weight %.

EXAMPLE 1

A sample of a photodegradable copolymer comprising styrene methyl isopropenyl ketone (MIPK) containing 5% of methyl isopropenyl ketone.

Fifty grams of the polymer was added to 950 grams of styrene monomer and the resulting mixture was heated to 50° C. for four hours to dissolve the copolymer. The solution was cooled to about 30° C. To the resulting hydrocarbon solution were added 3.3 grams of benzoyl peroxide and 1.25 grams of t-butyl perbenzoate as initiators. The solution was heated to 85° C. for about 1.5 hours to convert about 20–30% of the mixture to polymer. The mixture was then cooled to stop polymerization.

To a 1 gallon reactor was added 2000 grams of deionized water, 20 grams of 5% polyvinyl alcohol (sold under the Trademark VINOL 523) and 10 grams of electrolyte (sodium chloride). The partially polymerized styrene solution was then added to the reactor and the solutions are mixed under medium agitation to form a suspension. The suspension is then heated to 85° C. for 1 to 2 hours to finish the polymerization.

The contents of the reactor were cooled and filtered to yield beads of polymer. The polymer was analyzed and found to contain 0.25% of MIPK.

The beads were sieved and were found suitable for foaming a closed cell foam container.

What is claimed is:

1. In a suspension polymerization process for the production of expandable polymer bead which is impregnated with a blowing agent wherein said polymer comprises:
    (i) from 50 to 100 weight % of one or more $C_{8-12}$ vinylaromatic monomers which are unsubstituted or substituted by a $C_{1-4}$ alkyl radical; and
    (ii) from 0 to 50 weight % of one or more monomers selected from the group consisting of:
    $C_{1-4}$ alkyl acrylates, $C_{1-4}$ alkyl methacrylates, anhydrides of $C_{4-6}$ dicarborylic acids and $C_{3-8}$ alkyl nitriles;
    the improvement comprising dissolving is in said vinyl aromatic monomer at least 1 weight % of a copolymer comprising:
    (i) from 0 to 99 weight % of one or more $C_{8-12}$ vinyl aromatic monomers which are unsubstituted or substituted by a $C_{1-4}$ alkyl radical; and
    (ii) from 1 to 100 weight % of one or more monomers of the formula:

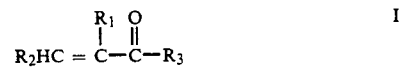

$$R_2HC = \overset{R_1}{\underset{|}{C}} - \overset{O}{\underset{\|}{C}} - R_3 \qquad I$$

wherein $R_1$, and $R_2$, are independently selected from the group consisting of a hydrogen atom and $C_{1-4}$ alkyl radical; and $R_3$ is selected from the group consisting of a $C_{1-4}$ alkyl radical and a $C_{6-10}$ aromatic radical.

2. The process according to claim 1 wherein said $C_{8-12}$ vinyl aromatic monomer is selected from the group consisting of styrene, α-methyl styrene, t-butyl styrene and p-methyl styrene.

3. The process according to claim 2, wherein said photodegradable polymer is present in an amount from 1 to 10 weight %.

4. The process according to claim 3, wherein said photodegradable polymer is present in an amount from 5 to 10 weight %.

5. The process according to claim 4, wherein in formula I in said photodegradable polymer $R_2$, is a hydrogen atoms and $R_1$, and $R_3$, are methyl radicals.

6. The process according to claim 5, wherein in formula I in said photodegradable polymer $R_1$, and $R_2$ are hydrogen atoms and $R_3$ is a methyl radical.

7. The process according to claim 5, wherein in said photodegradable polymer said vinyl aromatic monomer is selected form the group consisting of styrene, α-methyl styrene, t-butyl styrene and p-methyl styrene.

8. The process according to claim 6, wherein in said photodegradable polymer said vinyl aromatic monomer is selected form the group consisting of styrene, α-methyl styrene, t-butyl styrene and p-methyl styrene.

9. The process according to claim 7, wherein said base polymer comprises a homopolymer of vinyl aromatic monomer.

10. The process according to claim 8, wherein said base polymer comprises a homopolymer of vinyl aromatic monomer.

11. The process according to claim 9, wherein said vinyl aromatic monomer is selected from the group consisting of styrene, α-styrene, t-butyl styrene and p-methyl styrene.

12. The process according to claim 10, wherein said vinyl aromatic monomer is selected from the group consisting of styrene, α-styrene, t-butyl styrene and p-methyl styrene.

13. The process according to claim 7, wherein said base polymer comprises a copolymer of styrene and one or more monomers selected from the group consisting of methyl acrylate, ethyl acrylate, butyl acrylate, methyl methacrylate, ethyl methacrylate, and butyl acrylate.

14. The process according to claim 8, wherein said base polymer comprises a copolymer of styrene and one or more monomers selected from the group consisting of methyl acrylate, ethyl acrylate, butyl acrylate, methyl methacrylate, ethyl methacrylate, and butyl acrylate.

15. The process according to claim 7, wherein said base polymer comprises a copolymer of styrene and one or more monomers selected from the group consisting of acrylonitrile and methacrylonitrile.

16. The process according to claim 8, wherein said base polymer comprises a copolymer of styrene and one or more monomers selected from the group consisting of acrylonitrile and methacrylonitrile.

17. The process according to claim 7, wherein said base polymer comprises a copolymer of styrene and maleic anhydride.

18. The process according to claim 8, wherein said base polymer comprises a copolymer of styrene and maleic anhydride.

* * * * *